United States Patent
Seth et al.

(10) Patent No.: US 11,681,671 B2
(45) Date of Patent: Jun. 20, 2023

(54) AUTOMATIC TUNING OF THRESHOLDS AND WEIGHTS FOR PAIR ANALYSIS IN A MASTER DATA MANAGEMENT SYSTEM

(71) Applicant: International Business Machines Corporation, Armonk, NY (US)

(72) Inventors: Abhishek Seth, Deoband (IN); Soma Shekar Naganna, Bangalore (IN); Geetha Sravanthi Pulipaty, Bangalore (IN); Mohit Singh Chouhan, Jaipur (IN); Rishabh Saraf, Siliguri (IN)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 17/209,313

(22) Filed: Mar. 23, 2021

(65) Prior Publication Data

US 2022/0309047 A1 Sep. 29, 2022

(51) Int. Cl.
G06F 16/00 (2019.01)
G06F 16/21 (2019.01)
G06F 16/2455 (2019.01)
G06F 16/215 (2019.01)

(52) U.S. Cl.
CPC .......... *G06F 16/217* (2019.01); *G06F 16/215* (2019.01); *G06F 16/24558* (2019.01)

(58) Field of Classification Search
None
See application file for complete search history.

(56) References Cited

U.S. PATENT DOCUMENTS

| | | | |
|---|---|---|---|
| 8,250,008 B1* | 8/2012 | Cao ........................ | G06Q 30/02 706/14 |
| 2008/0005106 A1* | 1/2008 | Schumacher ..... | G06F 16/24556 |
| 2010/0325134 A1* | 12/2010 | Galfond ................ | G06F 16/951 707/769 |
| 2012/0087549 A1* | 4/2012 | Benini ................. | G06V 10/764 382/115 |
| 2014/0095143 A1* | 4/2014 | Jan ........................ | G06F 40/129 704/2 |
| 2016/0085852 A1 | 3/2016 | Deshpande | |
| 2016/0180245 A1 | 6/2016 | Tereshkov | |
| 2018/0113928 A1 | 4/2018 | Oberhofer | |
| 2020/0134483 A1 | 4/2020 | Bremer | |
| 2022/0414523 A1* | 12/2022 | Khatibi ............... | G06F 16/3331 |

OTHER PUBLICATIONS

"Method for Analysis of a System for Data Registration Association, Legible Storage Media by Computer and Computational System for Analysis of an Identity Center", Goldenberg et al., 25 pages. (Year: 2008).*

* cited by examiner

*Primary Examiner* — Bai D Vu
(74) *Attorney, Agent, or Firm* — Stephen R. Yoder

(57) ABSTRACT

An approach for tuning a data management system is provided. A processor retrieves one or more samples pairs of record data. A processor determines an error rate regarding the performance of a matching operation of a data management system based on the one or more sample pairs. In response to the error rate being above a value, a processor adjusts at least one threshold value associated with the matching operation of the data management system.

12 Claims, 5 Drawing Sheets

AUTOMATIC TUNING OF THRESHOLDS AND WEIGHTS FOR PAIR ANALYSIS IN A MASTER DATA MANAGEMENT SYSTEM

BACKGROUND OF THE INVENTION

The present invention relates generally to the field of master data management, and more particularly to pair analysis between records.

Data Management is the process of managing an organization's data. Data management systems typically provide a single, trusted repository of data used across the majority of the organization and serves as a central source of data for other systems and processes. For example, a company may employ an data management system to collect and store all customer information into a single source that can be used by other systems in the organization (such as order fulfillment by an operations team and offer solicitations by sales team). Pair Analysis is a process in data management systems that is utilized to test and improve the matching accuracy of identifying records in the data management that are attributed to the same entity, such as duplicate customer records. Matching records maintained by the data management found to be duplicates are typically consolidated into a single record or otherwise indicated as related.

SUMMARY

Embodiments of the present invention provide a method, system, and program product to automatically tune a matching operation of a master data management (MDM) system. A processor retrieves one or more samples pairs of record data. A processor determines an error rate regarding the performance of a matching operation of a MDM system based on the one or more sample pairs. In response to the error rate being above a value, a processor adjusts at least one threshold value associated with the matching operation of the MDM system.

DETAILED DESCRIPTION

Figure 1:
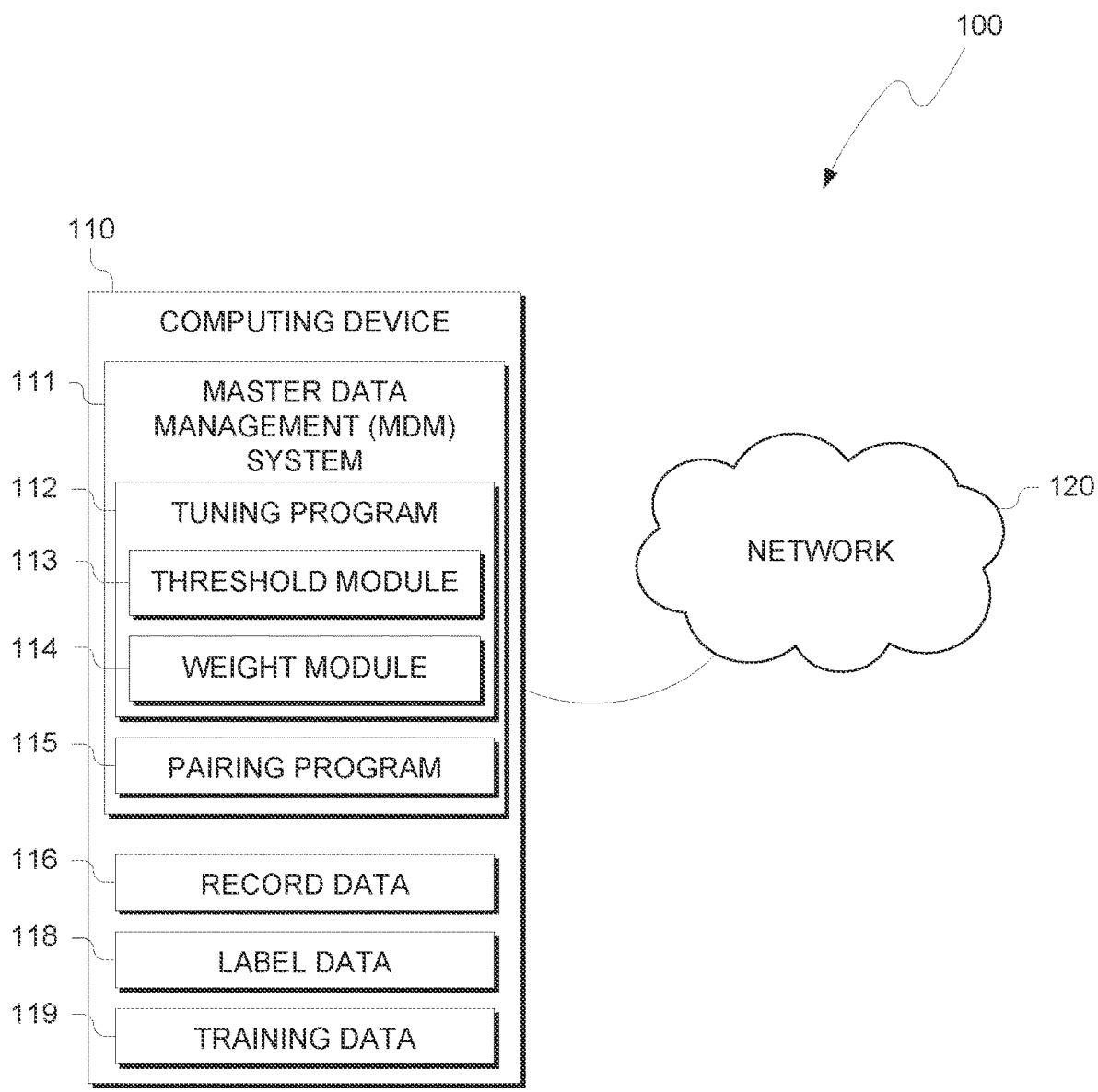
FIG. 1 is a functional block diagram illustrating a networked environment, in accordance with an exemplary embodiment of the present invention.

While prior solutions have offered Pair Analysis, Master Data Management (MDM) systems are manually adjusted by Subject Matter Experts (SMEs) or data scientists familiar with the data set being maintained by the MDM System. Embodiments of the present invention provide an automatic approach that adjusts the thresholds and weights employed by the Pair Analysis aspect of an MDM System. Embodiments of the present invention improve prior solutions by reducing the time associating with manually training Pair Analysis in an MDM system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes computing device 110 connected over network 120. Computing device 110 includes Master Data Management (MDM) system 111, tuning program 112, threshold module 113, weight module 114, record data 116, label data 118, and training data 119.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to record data 116, label data 118, and training data 119 and is capable of executing MDM system 111, tuning program 112, threshold module 113, and weight module 114. Computing device 110 may include internal and external hardware components, as depicted and described in further detail with respect to FIG. 5.

In this exemplary embodiment, MDM system 111, tuning program 112, threshold module 113, weight module 114, record data 116, label data 118, and training data 119 are stored on computing device 110. However, in other embodiments, MDM system 111, tuning program 112, threshold module 113, weight module 114, record data 116, label data 118, and training data 119 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 110 and other devices that access record data 116 of MDM system 111 (not shown), in accordance with a desired embodiment of the present invention.

In various embodiments, master data management (MDM) system 111 maintains record data 116. Record data 116 includes various database entries, or any other data structure, to store and maintain information. For each record, record data 116 includes various attributes or data relating to the subject of the record. For example, record data 116 includes database records for customer information, with attributes such as names and addresses of the various customers. One of ordinary skill in the art will appreciate, based on the following, that record data 116 may include any type of data and be stored in any form without deviating from the invention.

In various embodiments, MDM system 111 routinely analyzes record data 116 to identify any records that are directed towards a similar entity or entry in record data 116. For example, two records for the same customer exist in record data 116. In one record, the user's first name is used in a FIRST_NAME entry of a record in record data 116. In another record, a nickname the user's provided is instead present in the FIRST_NAME entry of the second record. In various embodiments, MDM system 111 identifies that the records are similar based on input from pairing program 115 that determines the records are similar based on machine learning and training to identify similar records. MDM system 111 compares the entries for each record and identifies that most entries, or attributes, of both records include similar attributes and should be combined or otherwise indicated as being similar records by MDM system 111. Returning to the example above, a direct comparison of address fields may provide that both records are directed towards the same customer and should be combined or otherwise indicated as related. In another scenario, MDM system 111 includes machines learning that has been trained to identify that the FIRST_NAME of both records are similar, even if the information is different (e.g., the first record has the name "William" while the other has the nickname "Bill").

In various embodiments, pairing program 115 of the MDM system 111 determines matching outcomes based on a multi-region threshold comparison. Based on the similarities of each attributes, MDM system 111 generates a matching metric when comparing the same attribute of two records in record data. Based on the value of the matching metric and the multi-region threshold values utilized, MDM system 111 determines if the two attributes match. Additionally, in various embodiments, MDM system 111 applies weights to the matching metrics for each attribute, combining the metrics based on the assigned weights. In some scenarios, certain similar attributes may provide stronger indicators than other attributes in a data set and are thereby reflected by the assigned weight. For example, an email address attribute may be more indicative of similar records than a date of account creation attribute. In such scenarios, and in various embodiments, the paring module of MDM system 111 assigns higher weights to attributes that are more indicative of matching records than other less influential attributes.

Prior solutions typically employ various subject matter experts and other human users to manually adjust the weights and thresholds utilized by the pairing program 115 of MDM system 111. Embodiments of the present invention provide an automatic approach for MDM system 111 to tune both the weights and thresholds utilized by pairing program 115. Tuning program 112 of MDM system 111 provides such an automatic adjustment of the weights and thresholds utilized by pairing program 115 of MDM system 111.

In various embodiments, tuning program 112 starts with an initial training stage with training data 119 in order to generate a set of initial thresholds for the types of records, or in some embodiments attributes, that the pairing module of MDM system 111. In various embodiments, the pairing module of the MDM system 111 utilizes two thresholds that correspond to three decision regions when comparing the similarity metric of two records during a potential paring of similar records in record data 116. A first upper-threshold, referred to as match threshold, serves as a bound to determine the certainty to MDM system 111 that two records are similar and should be combined, merged or otherwise paired together. A second lower-threshold, referred to as a non-match threshold, serves as a bound to determine the certainty to MDM system 111 that two records are dissimilar and should not be paired. A third region is created were MDM system 111 cannot conclusively determine if the records should be matched or not. For record comparisons that fall in this region, MDM system 111 may set the records aside for later review as the thresholds and weights a tuned and adjusted by tuning program 112. In other scenarios, MDM system 111 may perform additional analysis to other attributes in record data 116 to determine if the similarity metric between records changes to a different region.

Training data 119 includes records, such as those discussed in regard to record data 116, as well as initial similarity between records. In some scenarios, training data 119 includes similarity on a per attribute basis of each records when compared to one or more other records in training data 119. Based on the provided similarity, tuning program 112 determines initial match and non-match thresholds as well as the attribute weights utilized during paring of records by MDM system 111.

In various embodiments, threshold module 113 of tuning program 112 determines match and non-match thresholds based on label data 118. Label data 118 includes values that indicate how similar records are to one another other. For example, label data 118 may include labels three labels, "Match", "Non-Match" and "Unsure". As another example, label data 118 includes a numerical range of values that indicate the extent two records match (e.g., a "1" would indicate that the records do not match at all and a "10" would represent a complete match between records, with values "2-9" representing the records that include some matching attributes but not all).

In various embodiments, threshold module 113 of tuning program 112 orders each record along a number line to a corresponding the degree of matching indicated by label data 118. In various embodiments, the match and nonmatch thresholds are initially set to a predetermined value. Based on the label data 118, threshold module 113 of tuning program 112 determines the number of records with non-matching labels below the non-match threshold as well as the number of records with matching label above the non-match threshold. In various embodiments, threshold module 113 of tuning program 112 determines both a False Positive Rate (FPR) and a False Negative Rate (FNR) based on the number of records that are labeled as matching but are aligned as non-matching based on the current non-matching threshold (i.e, FNR), or records that are that are labeled as non-matching but are aligned as matching based on the current matching threshold (i.e, FPR).

In various embodiments, threshold module 113 of tuning program 112 creates a binary search tree for both the matching threshold and non-matching threshold. IN the search tress, threshold module 113 increases and decreases the threshold slightly for each level of the search tree. Based on a desired FPR and FNR, threshold module 113 traverses the search trees and identifies a new matching threshold and a new non-matching threshold that achieves the desired FPR and FNR.

In various embodiments, tuning program 112 determines similarity labels based on weight module 114. Weight module 114 determines the various weights applied to attributes of each record. Attributes with higher weights indicates attributes that strongly indicating that records may be matched upon, versus attributes with lesser weights that may indicate attributes that do not typically indicate matching records. For example, weight module 114 may place higher weights to an address attribute when matching customer records (since matching addresses would likely indicate the same customer), while a purchase history attribute may be less indicative of matching records, as different customers may purchase similar products. In various embodiments, weight module 114 determines a matching metric of an attribute between two records and applies the weight, along with the weight and matching metrics for the other attributes, to determine if the two records match and then generating label data 118 based on the degree of matching.

In various embodiments, weight module 114 of tuning program 112 automatically tunes the weights for each attribute. Initially, weight module 114 identifies attributes that have contributed to incorrect or false matches (e.g., either false positive or false negative matches). In various embodiments, weight module 114 determines a false positive ratio and a false negative ratio for each attribute. The false positive ratio is the ratio of the number of false positive matches across all other labels minus the number of false negatives. The false negative ratio is the ratio of the number of false negative matches across all other labels minus the number of false positives.

In various embodiments, weight module 114 creates two ordered lists of each attribute for both the false positive ratio and the false negative ratio, ordering the lists based on largest ratio first. Weight module 114 determines a distance range and intervals for analysis for each attribute in the ordered lists. Distance indicates how similar attributes are, with lower distance indicating greater matching attributes that greater distances. Based on the distance range, weight module 114 determines a weight for each distance interval.

In various embodiments, weight module 114 performs combination optimization for each interval change in distance. Weight module 114 includes an optimization engine that maximizes the accuracy of the selection of new distances and therefore new weights. Accuracy is the ratio of all records over all records and the total number of false negatives and false positives. The decision variables for the optimization engine are the weights for each attribute, with the constraints being the distance range and intervals previously determined for faulty attributes (i.e., attributes that have larger false positive or false negative ratio). Based on the above optimization model, weight module 114 maximizes the objective function of accuracy. Based on the optimization, weight module 114 generates a new set of weights that are optimized to maximize accuracy of weight module 114, updating pairing program 115 for MDM system 111. In various embodiments, weight module 114 continuously, routinely or otherwise automatically updates weights of attributes utilized in pair analysis by MDM system 111. In some scenarios, weight module 114 is invoked for weight optimization in scenarios where FPR or FNR during threshold tuning by threshold module 113 reach certain threshold values. With new weights, threshold values will in turn be updated, improving both subsystems. However, if threshold testing provides desirable results the tuning of weights by tuning program 112 may not occur in such scenarios and embodiments.

Figure 2:
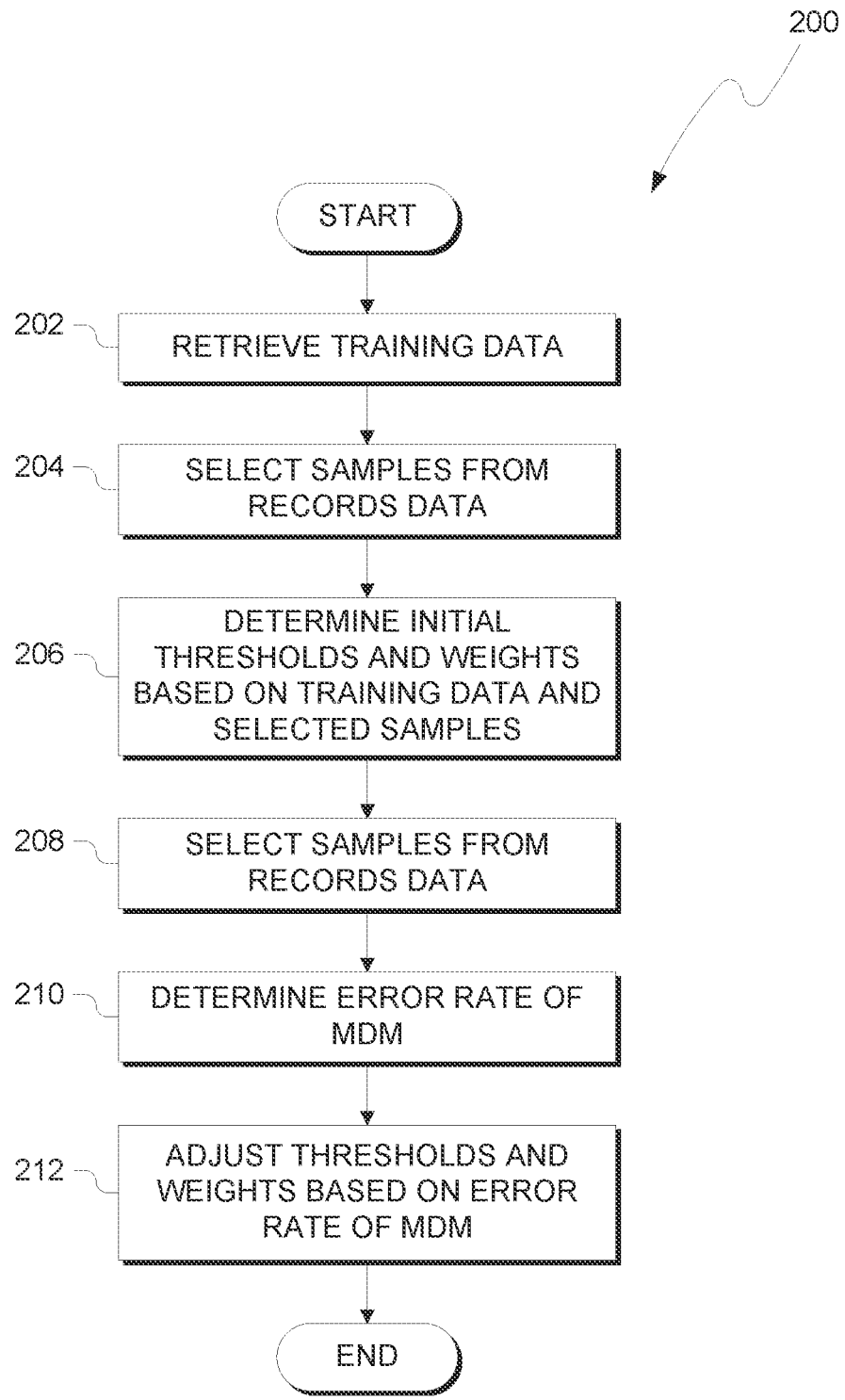
FIG. 2 illustrates operational processes of a tuning program, on a computing device within the environment of FIG. 1, in accordance with an exemplary embodiment of the present invention.

FIG. 2 illustrates operational processes, generally designated 200, of tuning program 112. In process 202, tuning program 112 retrieves training data 119. Training data 119 includes records that include predetermined similarity metrics between records. In some embodiments, training data 119 may include pointers or other references to records in record data 116 that can be used for training of tuning program 112. In process 204, tuning program 112 selects records from training data 119 as samples for training and tuning of weights and thresholds utilized by the paring analysis of MDM system 111. In process 206, tuning program 112 determines an initial threshold and weight values which is discuss in regard to FIGS. 3 and 4, respectively.

Once an initial set of thresholds and weights are determined, tuning program 112 selects a new batch of records from record data 116 (process 208). In some embodiments, tuning program 112 selects records from records data 116 based on a random selection. In other embodiments, tuning program 112 selects records from record data 116 based on values or other aspects of the records. For example, tuning program 112 may select records, or attributes in regard to training weights, known to cause false positive or negative rates to increase. During operation of pairing program 115, MDM system 111 may copy, or point to, records that have been found to increase the false positive or negative rates for training of tuning program 112.

In process 210, tuning program 112 monitors the error rate of MDM system 111. In some scenarios and based on the selected sample in process 208, tunning program 112 monitors the error rate of the pair module for MDM system 111. In other scenarios, MDM system 111 generates ongoing measurements of FPR and FNR of the pair analysis. If the FPR on FNR of the pair analysis module reach a certain threshold value, then tuning program 112 adjusts the threshold or weights used by pairing program 115 for MDM system 111 (process 212).

Figure 3:
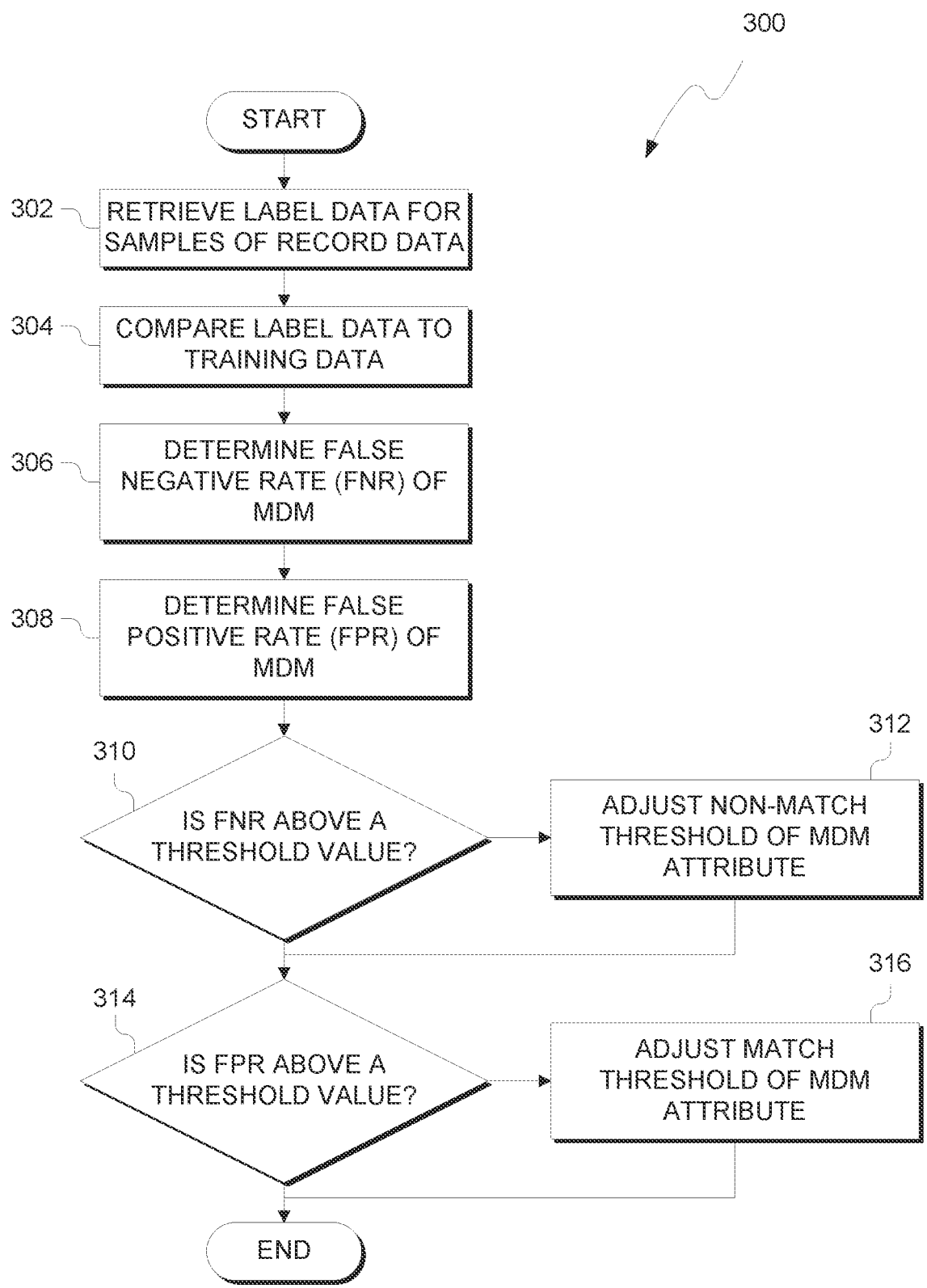
FIG. 3 illustrates operational processes of threshold module of a tuning program, on a computing device within the environment of FIG. 1, in accordance with an exemplary embodiment of the present invention.

FIG. 3 illustrates operational processes, generally designated 300, of threshold module 113 of tuning program 112. FIG. 3 illustrates the automatic adjustment of thresholds utilized by pairing program 115 of MDM system 111. In process 302, tuning program 112 retrieves label data 118 for the sample that will be used to adjust pairing program 115 of MDM system 111. In some embodiments, tuning program 112 compares the label data 118 to training data 119 (process 304). In some scenarios, record data 116 may include training data 119 which includes user-provided indication of a degree records in record data 116 match. Process 304 is performed initially as a training mechanism. In some embodiments and in subsequent calls of threshold module 113, process 304 is not performed and tuning program 112 performs unsupervised training and tuning of thresholds utilized by pairing program 115 in MDM system 111.

In process 306, tuning program 112 determines a false negative rate (FNR) of MDM system 111. Based on label data 118, whether containing supervised training data 119 or direct results of MDM system, tuning program 112 determines the rate at which the pairing analysis of MDM system 111 falsely decides not to combine or pair records. In process 308, tuning program 112 determines a false positive rate (FPR) of MDM system 111. Based on label data 118, whether containing supervised training data 119 or direct results of MDM system, tuning program 112 determines the rate at which the pairing analysis of pairing program 115 falsely decides to combine or pair records.

In decision process 310, tuning program 112 determines if the FNR is above a threshold. If the FNR is above the threshold, then tunning program 112 adjusts the non-match threshold of the MDM system for the type of record or in some instances based on the attribute that caused the FNR to increase (process 312). If FNR is at an acceptable level, then tuning program 112 proceeds to decision process 314. In decision process 314, tuning program 112 determines if the FPR is above a threshold. If the FPR is above the threshold, then tunning program 112 adjusts the match threshold of the MDM system for the type of record or in some instances based on the attribute that caused the FPR to increase (process 316). If FPR is at an acceptable level, then tuning program 112 repeats the processes 300 in a routine manner or if FNR or FPR are monitored to be greater than the threshold values detailed in processes 312 and 314.

In various embodiments, processes 312 and 316 of tuning program 112 include the processes of generating a binary search tree where a positive and negative change to threshold values is considered with each depth level of the search tree. Tuning program 112 traverses the search tree to identify the resulting node (and total net positive/negative change to the threshold) that minimizes FNR and FPR.

Figure 4:
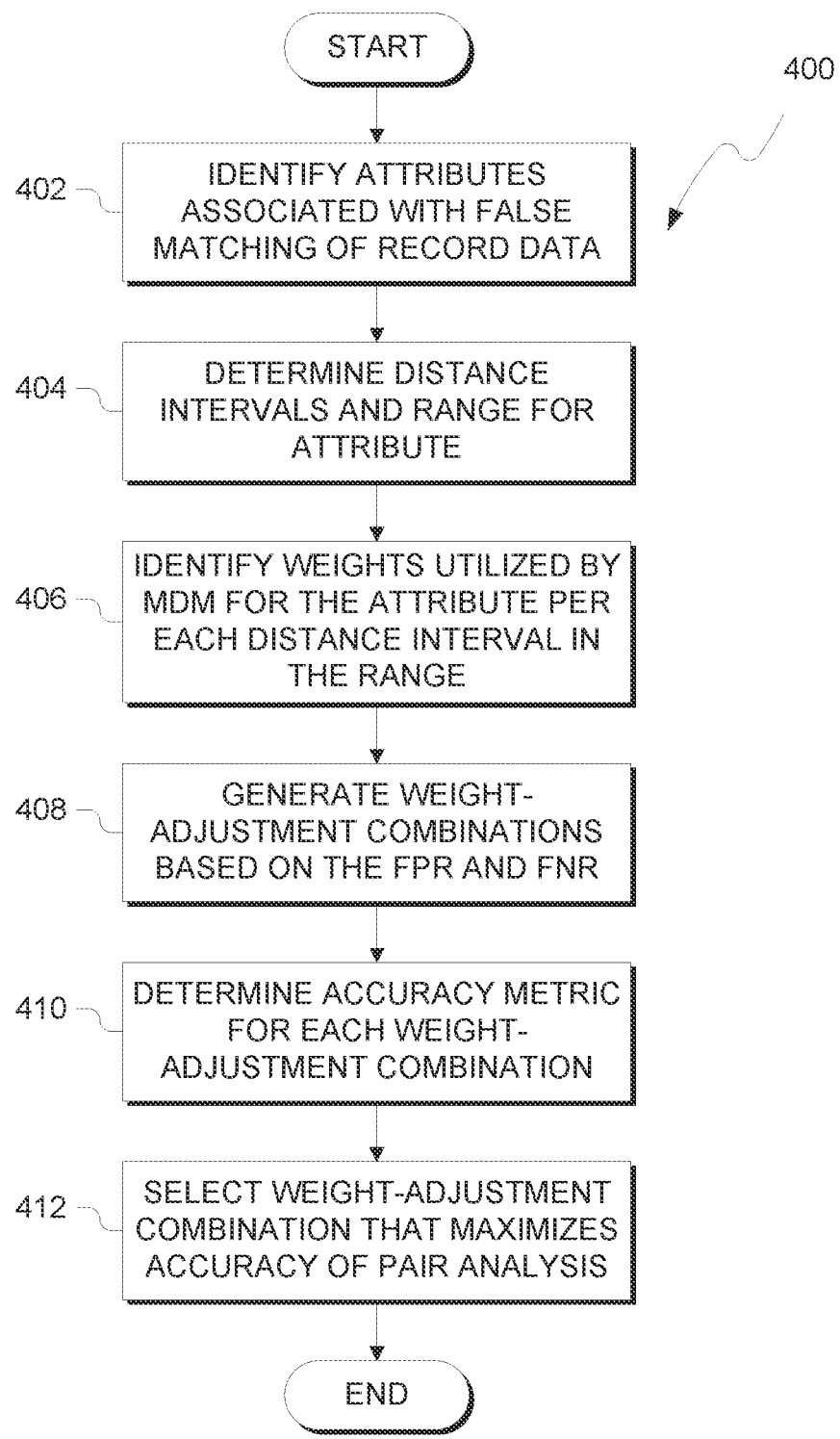
FIG. 4 illustrates operational processes of weight module of a tuning program, on a computing device within the environment of FIG. 1, in accordance with an exemplary embodiment of the present invention.

FIG. 4 illustrates operational processes, 400, of tuning program 112. In process 402, tuning program 112 identifies attributes which cause false matching of records (i.e., either false positives of false negatives). Based on monitoring of MDM system 111 during pairing of records, weight module 114 performs root-cause analysis to determine the attribute or attributes that may have cause false negatives of false positives. In process 404, weight module 114 creates two ordered lists of each attribute for both the false positive ratio and the false negative ratio, ordering the lists based on largest ratio first. Weight module 114 determines a distance range and intervals for analysis for each attribute in the ordered lists. Distance indicates how similar attributes are, with lower distance indicating greater matching attributes that greater distances. Based on the distance range, weight module 114 determines a weight for each distance interval.

In process 406, weight module 114 identifies the current weights used by MDM system 111, as well as the distance intervals associated with the weights. In process 408. weight module 114 performs combination optimization for each interval change in distance. Weight module 114 includes an optimization engine that maximizes the accuracy of the selection of new distances and therefore new weights. In process 410, weight module 114 determines the accuracy metric for the combinations. Accuracy is the ratio of all records over all records and the total number of false negatives and false positives. The decision variables for the optimization engine are the weights for each attribute, with the constraints being the distance range and intervals previously determined for faulty attributes (i.e., attributes that have larger false positive or false negative ratio). Based on the above optimization model, weight module 114 maximizes the objective function of accuracy (process 412). Based on the optimization, weight module 114 generates a new set of weights that are optimized to maximize accuracy of weight module 114, updating pairing program 115 for MDM system 111. In various embodiments, weight module 114 continuously, routinely or otherwise automatically updates weights of attributes utilized in pair analysis by pairing program 115 of MDM system 111.

Figure 5:
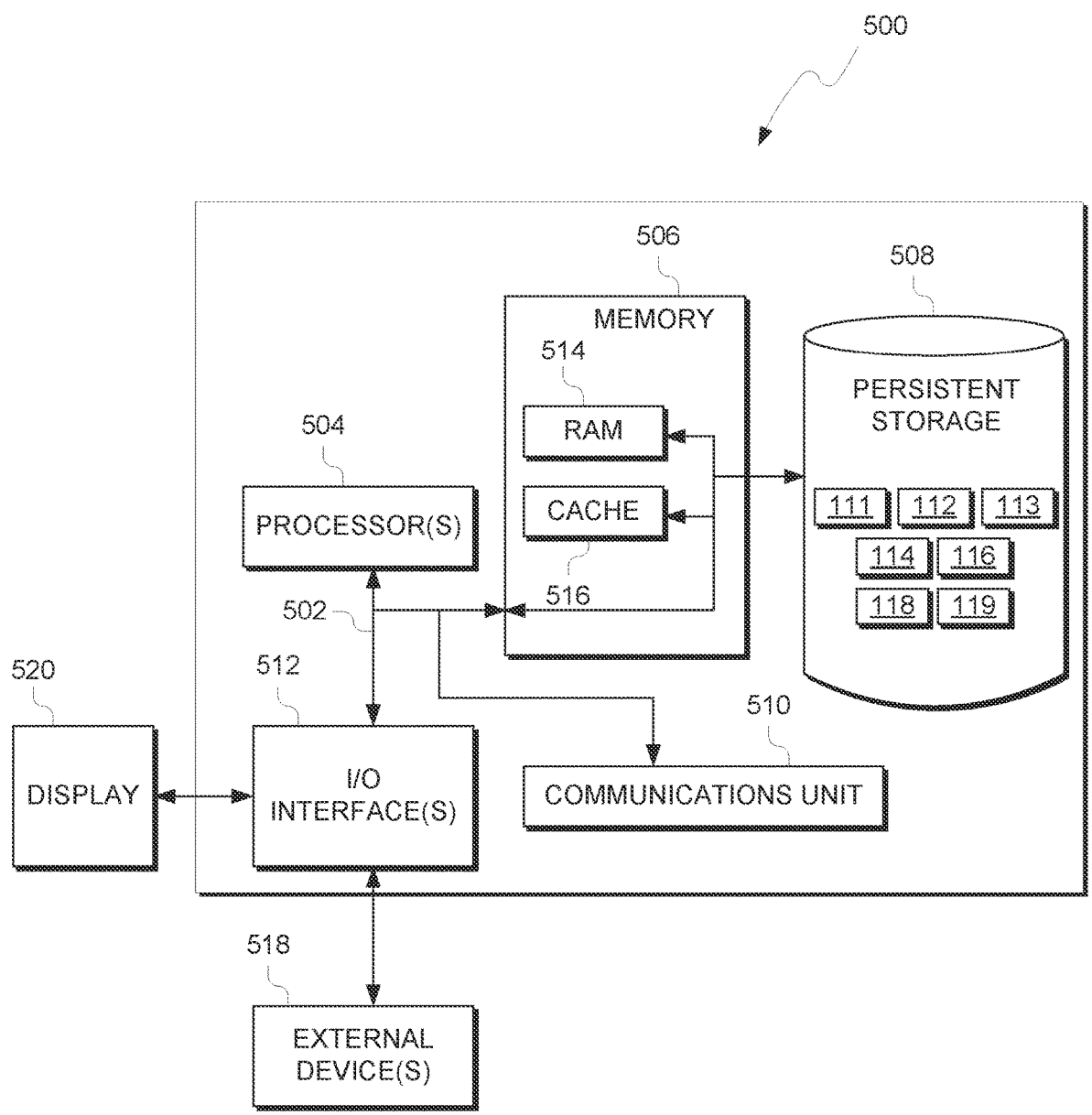
FIG. 5 depicts a block diagram of components of the computing device executing a tuning program, in accordance with an exemplary embodiment of the present invention.

FIG. 5 depicts a block diagram, 500, of components of computing device 110, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

MDM system 111, tuning program 112, threshold module 113, weight module 114, record data 116, label data 118, and training data 119 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 130. In these examples, communications unit 510 includes one or more network interface cards. Communications unit 510 may provide communications through the use of either or both physical and wireless communications links. MDM system 111, tuning program 112, threshold module 113, weight module 114, record data 116, label data 118, and training data 119 may be downloaded to persistent storage 508 through communications unit 510.

I/O interface(s) 512 allows for input and output of data with other devices that may be connected to computing device 110. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., MDM system 111, tuning program 112, threshold module 113, weight module 114, record data 116, label data 118, and training data 119, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method for tuning a master data management (MDM) system, the method comprising:
retrieving, by one or more processors, one or more sample pairs of record data;
determining, by the one or more processors, a false positive rate regarding a performance of a matching operation of the MDM system based on the one or more sample pairs;

determining, by the one or more processors, a false negative rate regarding the performance of a matching operation of the MDM system based on the one or more sample pairs;

in response to the false positive rate being above a first threshold value, adjusting, by the one or more processors, a matching region threshold value associated with the matching operation of the MDM system; and in response to the false negative rate being above a second threshold value, adjusting, by the one or more processors, a non-matching region threshold value associated with the matching operation of the MDM system.

2. The method of claim 1, wherein the adjusting the matching region threshold value and the non-matching region threshold value associated with the matching operation of the MDM system further comprises:

generating, by the one or more processors, a binary search tree, wherein each depth level of the binary search tree adjusts the matching region threshold value or the non-matching region threshold value by a pre-determined interval; and adjusting, by the one or more processors, the matching region threshold value or the non-matching region threshold value associated with the matching operation of the MDM system based on an identification of a node in the binary search tree which minimizes the false positive rate and the false negative rate of the matching operation of the MDM system.

3. The method of claim 1, the method further comprising:

identifying, by the one or more processors, one or more attribute weights associated the at least one threshold value;

determining, by the one or more processors, an attribute distance range for the one or more attribute weights; and determining, by the one or more processors, one or more neighboring weights based on the attribute distance range.

4. The method of claim 3, the method further comprising:

adjusting, by the one or more processors, the one or more attribute weights based on a maximization of an accuracy objective function of the MDM system.

5. A computer program product for tuning a master data management (MDM) system, the computer program product comprising:

one or more computer-readable storage media and program instructions stored on the one or more computer-readable storage media, the program instructions comprising:

program instructions to retrieve one or more sample pairs of record data;

program instructions to determine a false positive rate regarding a performance of a matching operation of the MDM system based on the one or more sample pairs;

program instruction to determine a false negative rate regarding the performance of a matching operation of the MDM system based on the one or more sample pairs;

in response to the false positive rate being above a first threshold value, program instructions to adjust a matching region threshold value associated with the matching operation of the MDM system; and in response to the false negative rate being above a second threshold value, program instructions to adjust a non-matching region threshold value associated with the matching operation of the MDM system.

6. The computer program product of claim 5, wherein the program instructions to adjust the matching region threshold value and the non-matching region threshold value associated with the matching operation of the MDM system further comprises:

program instructions to generate a binary search tree, wherein each depth level of the binary search tree adjusts the matching region threshold value or the non-matching region threshold value by a pre-determined interval; and program instructions to adjust the matching region threshold value or the non-matching region threshold value associated with the matching operation of the MDM system based on an identification of a node in the binary search tree which minimizes the false positive rate and the false negative rate of the matching operation of the MDM system.

7. The computer program product of claim 5, the program instructions further comprising:

program instructions to identify one or more attribute weights associated the at least one threshold value;

program instructions to determine an attribute distance range for the one or more attribute weights; and program instructions to determine one or more neighboring weights based on the attribute distance range.

8. The computer program product of claim 7, the program instructions further comprising:

program instructions to adjust the one or more attribute weights based on a maximization of an accuracy objective function of the MDM system.

9. A computer system for tuning a master data management (MDM) system, the computer system comprising:

one or more computer processors;

one or more computer readable storage media; and program instructions stored on the computer readable storage media for execution by at least one of the one or more processors, the program instructions comprising:

program instructions to retrieve one or more sample pairs of record data;

program instructions to determine a false positive rate regarding a performance of a matching operation of the MDM system based on the one or more sample pairs;

program instruction to determine a false negative rate regarding the performance of a matching operation of the MDM system based on the one or more sample pairs;

in response to the false positive rate being above a first threshold value, program instructions to adjust a matching region threshold value associated with the matching operation of the MDM system; and in response to the false negative rate being above a second threshold value, program instructions to adjust a non-matching region threshold value associated with the matching operation of the MDM system.

10. The computer system of claim 9, wherein the program instructions to adjust the matching region threshold value and the non-matching region threshold value associated with the matching operation of the MDM system further comprises:

program instructions to generate a binary search tree, wherein each depth level of the binary search tree adjusts the matching region threshold value or the non-matching region threshold value by a pre-determined interval; and program instructions to adjust the matching region threshold value or the non-matching region threshold value associated with the matching operation of the MDM system based on an identification of a node in the binary search tree which minimizes the false positive rate and the false negative rate of the matching operation of the MDM system.

11. The computer system of claim 9, the program instructions further comprising:

program instructions to identify one or more attribute weights associated the at least one threshold value;

program instructions to determine an attribute distance range for the one or more attribute weights; and program instructions to determine one or more neighboring weights based on the attribute distance range.

12. The computer system of claim 11, the program instructions further comprising:

program instructions to adjust the one or more attribute weights based on a maximization of an accuracy objective function of the MDM system.

* * * * *